E. LEFFINGWELL.
MACHINE FOR TRIMMING TEAZLE.

No. 77,296.          Patented Apr. 28, 1868.

Witnesses:
F. Lehmann
A. A. Yeatman

Inventor:
E. Leffingwell
Per
Alexander Mason
Atty.

United States Patent Office.

ELISHA LEFFINGWELL, OF SEMPRONIUS, NEW YORK.

Letters Patent No. 77,296, dated April 28, 1868; antedated April 16, 1868.

IMPROVEMENT IN MACHINE FOR TRIMMING TEAZLES.

The Schedule referred to in these Letters Patent and making part of the same.

TO ALL WHOM IT MAY CONCERN:

Be it known that I, ELISHA LEFFINGWELL, of Sempronius, in the county of Cayuga, and in the State of New York, have invented certain new and useful Improvements in Teazle-Trimming Machine; and do hereby declare that the following is a full, clear, and exact description thereof, reference being had to the accompanying drawings, and to the letters of reference marked thereon.

In the annexed drawings, making part of this specification, A represents the base of the machine, which has erected upon it two uprights, B B.

C represents a cross-bar, which is framed into the uprights B B, at their upper ends, connecting them together. Lying crosswise of the two uprights B B, and having bearings in them, is a shaft, D. This shaft D has a crank at its centre, and a fly-wheel, G, at one end, and a bevel-gear wheel, H, at the other. E represents a pitman, which connects the crank of shaft D to the treadle F. I represents a small vertical shaft, which has a crank upon its lower end, a pulley, d, near its upper end, and near its centre a small bevel-wheel, a, which gears into the wheel H.

P represents a pitman, one end of which is connected to the crank on shaft I, while the other end is secured to a cutter-bar, o, which is held in suitable bearings on the under side of cross-bar C.

Figure 1:
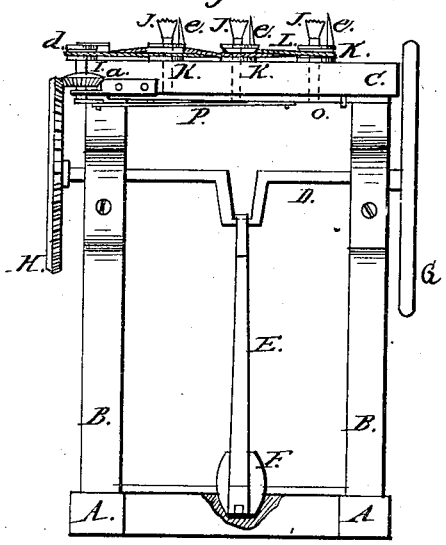
Figure 2:
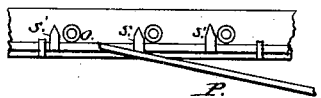

This cutter-bar o is provided with cutters, s s, as seen in Figure 2. J J represent tubes, which are secured in a vertical position in the cross-bar C, at stated distances apart, their lower ends projecting slightly below the bar, and their upper ends made flaring, and provided with teeth, as represented. Around each of the tubes J J, are placed loose pulleys, K K, and upon the upper faces of these pulleys are secured cutting-blades, e e, which project upward, with their points just above the upper ends of the tubes.

A belt, L, passes around the pulleys K K, and then around pulley d of shaft I.

When the treadle sets the shaft D, with its wheel, H, in motion, motion is communicated, through wheel a, to the pulleys, and these pulleys K K revolving, carry their cutting-blades around the upper ends of tubes J J.

The machine being set in motion, the teazle-stalks are inserted in the upper ends of the tubes J J, and the blades e e revolving, trim the burr-ends of their thorns or sword-leaves, while the cutters s s, playing close to the lower ends of the tubes, cut the stems of equal length, severing them in suitable and equal parts.

Having thus fully described my invention, what I claim as new, and desire to secure by Letters Patent, is—

1. The tubes J J, constructed substantially as described, and used with the pulleys K K, and their revolving blades e e, as and for the purpose set forth.

2. The cutter-bar o, with its cutters s s, in combination with the tubes J J, as and for the purpose set forth.

In testimony that I claim the foregoing, I have hereunto set my hand and seal, this 22d day of June, 1867.

ELISHA LEFFINGWELL. [L. S.]

Witnesses:
   JACOB H. AMERMAN,
   JAMES KINYON.